(12) United States Patent
Eshraghi et al.

(10) Patent No.: US 8,071,251 B2
(45) Date of Patent: Dec. 6, 2011

(54) FUEL CELL MODULE INCLUDING MICROCELLS

(75) Inventors: Raymond R. Eshraghi, Cary, NC (US); John Peter Cavaroc, Chapin, SC (US); Mack Lester Nance, Jr., Raleigh, NC (US)

(73) Assignee: Microcell Corporation, Raleigh, NC (US)

( * ) Notice: Subject to any disclaimer, the term of this patent is extended or adjusted under 35 U.S.C. 154(b) by 457 days.

(21) Appl. No.: 12/273,241

(22) Filed: Nov. 18, 2008

(65) Prior Publication Data

US 2009/0130511 A1      May 21, 2009

Related U.S. Application Data

(60) Provisional application No. 60/988,906, filed on Nov. 19, 2007.

(51) Int. Cl.
*H01M 8/24* (2006.01)
(52) U.S. Cl. .......................... 429/466; 429/458; 429/470
(58) Field of Classification Search .................. 429/466, 429/497, 456, 458, 460, 461, 470
See application file for complete search history.

(56) References Cited

U.S. PATENT DOCUMENTS

| | | | |
|---|---|---|---|
| 4,374,184 A * | 2/1983 | Somers et al. ................. | 429/423 |
| 4,520,082 A * | 5/1985 | Makiel ........................... | 429/460 |
| 5,916,514 A | 6/1999 | Eshraghi | |
| 5,928,808 A | 7/1999 | Eshraghi | |
| 5,989,300 A | 11/1999 | Eshraghi | |
| 6,004,691 A | 12/1999 | Eshraghi | |
| 6,338,913 B1 | 1/2002 | Eshraghi | |
| 6,399,232 B1 | 6/2002 | Eshraghi | |
| 6,403,248 B1 | 6/2002 | Eshraghi | |
| 6,403,517 B1 | 6/2002 | Eshraghi | |
| 6,444,339 B1 | 9/2002 | Eshraghi | |
| 6,492,050 B1 * | 12/2002 | Sammes ....................... | 429/423 |
| 6,495,281 B1 | 12/2002 | Eshraghi | |
| 6,506,511 B1 | 1/2003 | Lakeman et al. | |
| 6,884,539 B2 | 4/2005 | Eshraghi | |
| 7,182,132 B2 | 2/2007 | Savage | |
| 7,229,712 B2 * | 6/2007 | Eshraghi et al. ............. | 429/466 |
| 7,354,545 B2 | 4/2008 | Eshraghi et al. | |
| 7,422,813 B2 | 9/2008 | Eshraghi et al. | |
| 2004/0023101 A1 * | 2/2004 | Jacobson et al. ............. | 429/38 |
| 2004/0058224 A1 | 3/2004 | Eshraghi et al. | |
| 2004/0191588 A1 | 9/2004 | Eshraghi et al. | |
| 2004/0219421 A1 | 11/2004 | Eshraghi | |
| 2005/0058872 A1 | 3/2005 | Blanchet et al. | |
| 2005/0147857 A1 * | 7/2005 | Crumm et al. ................. | 429/31 |
| 2005/0181269 A1 | 8/2005 | Eshraghi et al. | |
| 2006/0118994 A1 | 6/2006 | Eshraghi et al. | |
| 2007/0243439 A1 | 10/2007 | Eshraghi et al. | |
| 2008/0044718 A1 * | 2/2008 | Wang et al. .................... | 429/38 |

OTHER PUBLICATIONS

U.S. Appl. No. 12/273,276, filed Nov. 18, 2008.

* cited by examiner

*Primary Examiner* — Hae Moon Hyeon
(74) *Attorney, Agent, or Firm* — Coats & Bennett, P.L.L.C.

(57) ABSTRACT

The present invention relates to fuel cell modules. The fuel cell module includes a housing that contains a plurality of fuel cell elements called unicells. Each unicell comprises a plurality of microcells. The housing is divided into a plurality of housing sections. A compressible bulkhead disposed between two adjacent housing sections and has a plurality of holes formed therein to allow respective unicells to pass through the bulkhead. A clamp element compresses the bulkhead to form a gas-tight seal between said bulkhead and the unicells.

27 Claims, 11 Drawing Sheets

FUEL CELL MODULE INCLUDING MICROCELLS

RELATED APPLICATION

This application claims the benefit of U.S. Provisional Patent Application 60/988,906 filed Nov. 19, 2007, which is incorporated herein by reference.

BACKGROUND

The present invention relates generally to electrochemical cell and fuel cell technology and, more particularly, to fuel cell modules including microfiber fuel cells or microtubular fuel cells, also known as microcells.

A fuel cell is a type of electrochemical energy device similar to a battery. A fuel cell includes a cathode and an anode separated by a membrane. A fuel, such as hydrogen, is supplied to the anode side of the fuel cell, while an oxidant, such as oxygen, is supplied to the cathode side of the fuel cell. The hydrogen splits into positive hydrogen ions and negatively-charged electrons. The membrane separator allows the positively-charged ions to pass through to the cathode side of the fuel cell. The negatively-charged electrons, however, must travel through an electric circuit to the cathode, thus creating an electrical current. At the cathode side of the fuel cell, the electrons and positively-charged hydrogen ions combine with oxygen to form water.

Microfiber fuel cells or microtubular fuel cells, also called microcells, represent one promising fuel cell technology. A microcell is a fiber-like fuel cell wherein the inner and outer current collectors, membrane separator and catalyst layers are extruded as a single fiber. The fibers may range in size from a few hundred to several thousand microns. One advantage of the fuel cell topology is that is achieves the highest possible Membrane Electrode Assembly (MEA) surface area to volume ratio, resulting in compact fuel cells. Another advantage is its scalability. The microcells can be assembled together in bundles to form units called unicells. The unicells can be further bundled to form larger units called modules.

SUMMARY

The present invention relates to fuel cell modules and to methods of assembling fuel cell modules from microcells. A plurality of microcells are bundled together to form units called unicells. A plurality of the unicells are, in turn, bundled together to form the fuel cell module. Novel ways of assembling unicells and fuel cell modules are described.

In one exemplary embodiment, a fuel cell module comprises a housing including a plurality of housing sections. The housing contains a plurality of elongated cylindrical fuel cell elements. A compressible bulkhead is disposed between two adjacent housing sections and has a plurality of holes formed therein to allow respective fuel cell elements to pass through the bulkhead. A clamp element radially compresses the bulkhead to form a gas-tight seal between the bulkhead and said fuel cell elements.

In another exemplary embodiment a fuel cell module comprises a housing including a plurality of housing sections. The housing contains a plurality of elongated cylindrical fuel cell elements. A plurality of bulkheads disposed between the housing sections form seals between adjacent housing sections. A pair of endplates disposed at opposing ends of said housing apply an axially compressive force to the housing to create a gas-tight seal between the housing sections and the bulkheads.

In another exemplary embodiment a fuel cell module comprises a housing including a plurality of housing sections. A plurality of bulkheads disposed between said housing sections divide the housing into a plurality of chambers including a reaction chamber for a first gas reactant, an inlet chamber for a second gas reactant, and an outlet chamber for the second gas reactant. The housing contains a plurality of elongated cylindrical fuel cell elements, which pass through respective openings in the bulkheads so that first end portions of said fuel cell elements are contained in said first inlet chamber, intermediate portions of said fuel cell elements are contained in the reaction chamber, and second end portions of said fuel cell elements are contained in the first outlet chamber. Clamps radially compress the bulkheads to form a gas-tight seal between said bulkheads and the fuel cell elements.

DETAILED DESCRIPTION

Figure 1:
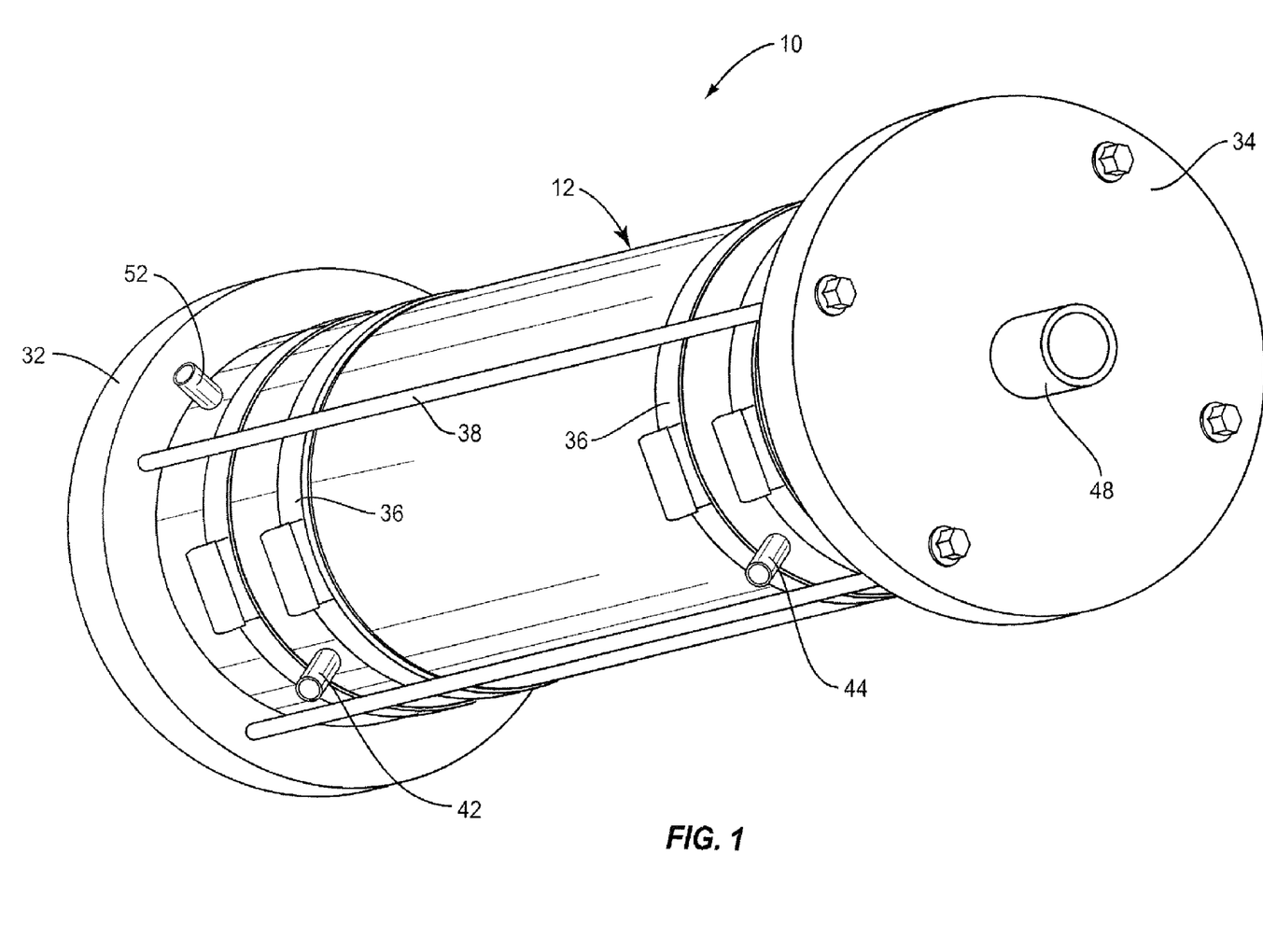
FIG. 1 is a perspective view of a fuel cell module 10
Figure 2:
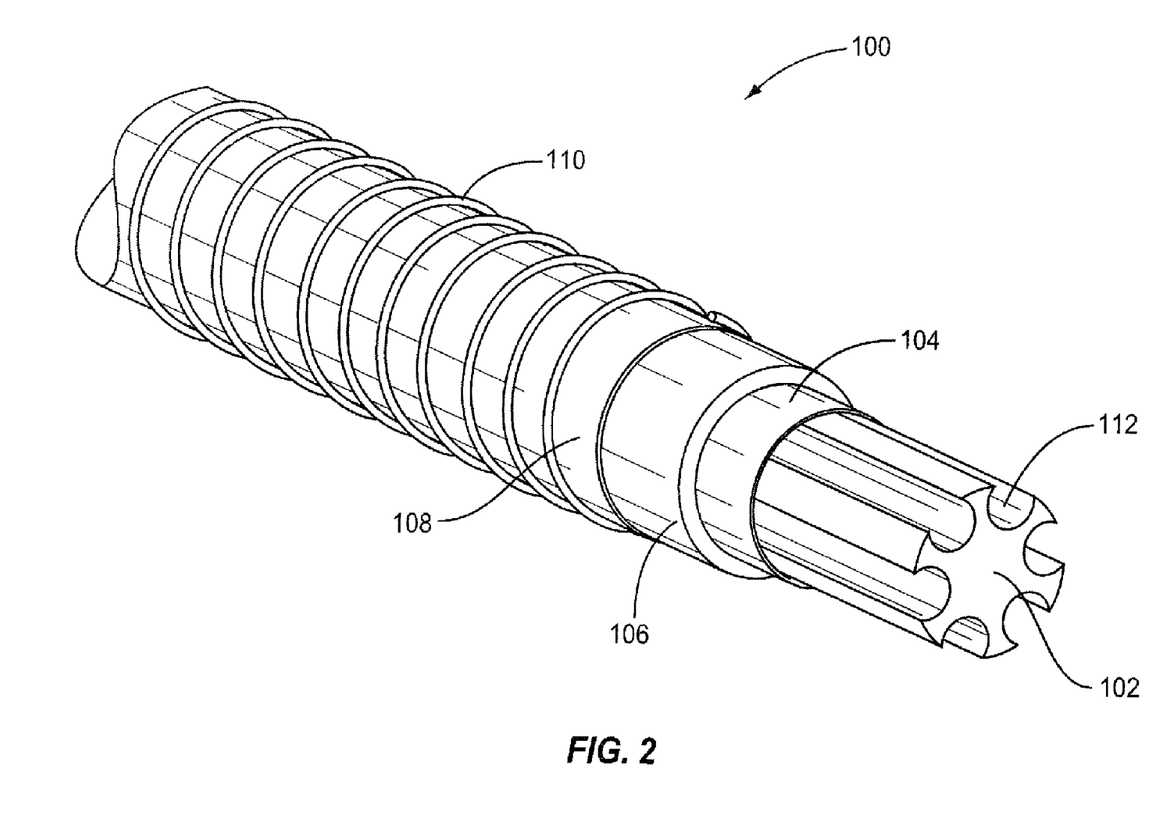
FIG. 2 is a perspective view of an exemplary microcell.
Figure 3:
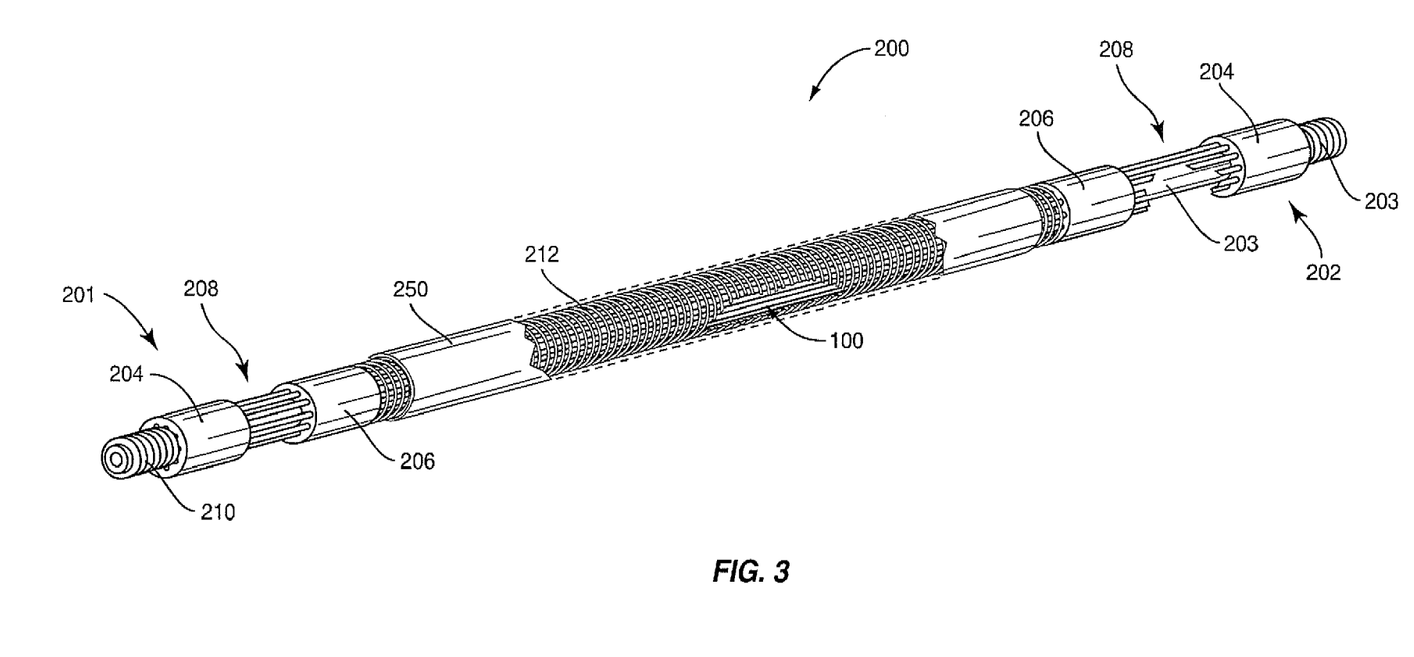
FIG. 3 is a perspective view of an exemplary unicell.
Figure 4A:
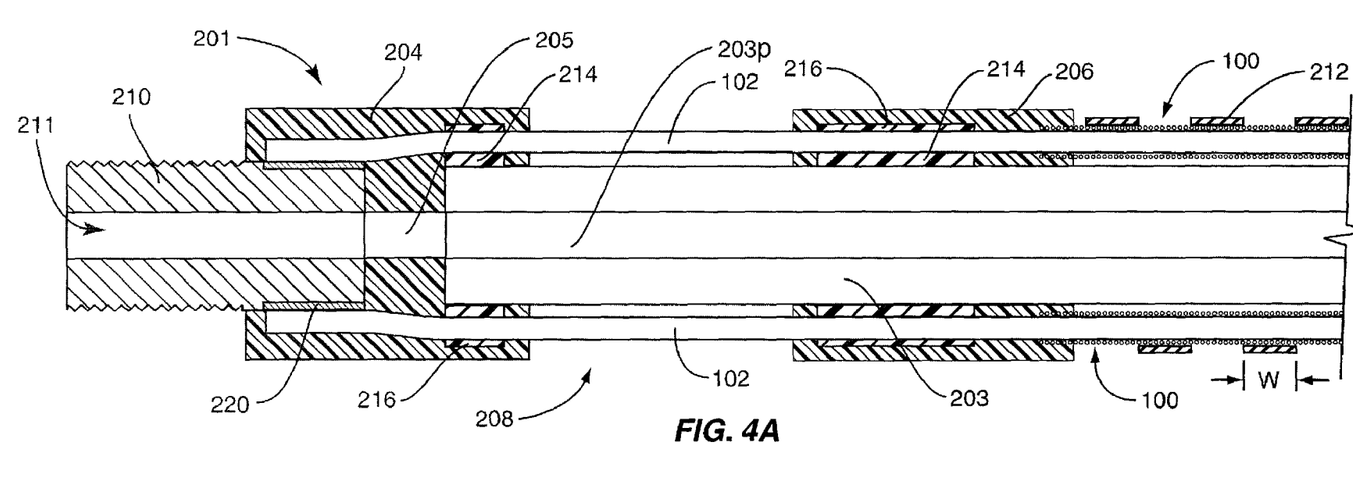
FIG. 4 is a longitudinal section view at a first end of an exemplary unicell.
Figure 4B:
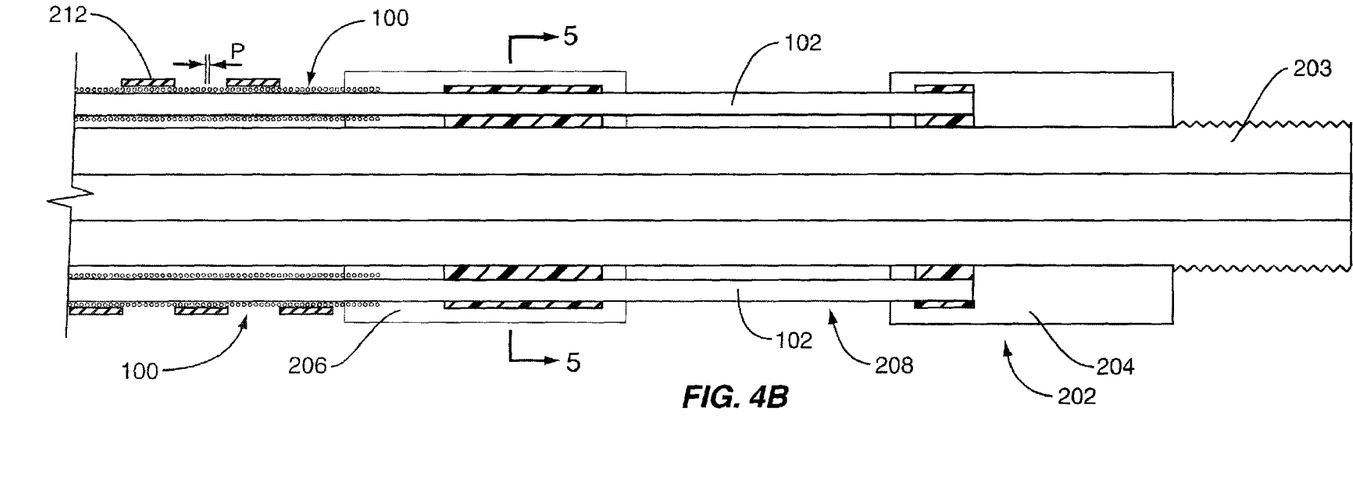
Figure 5:
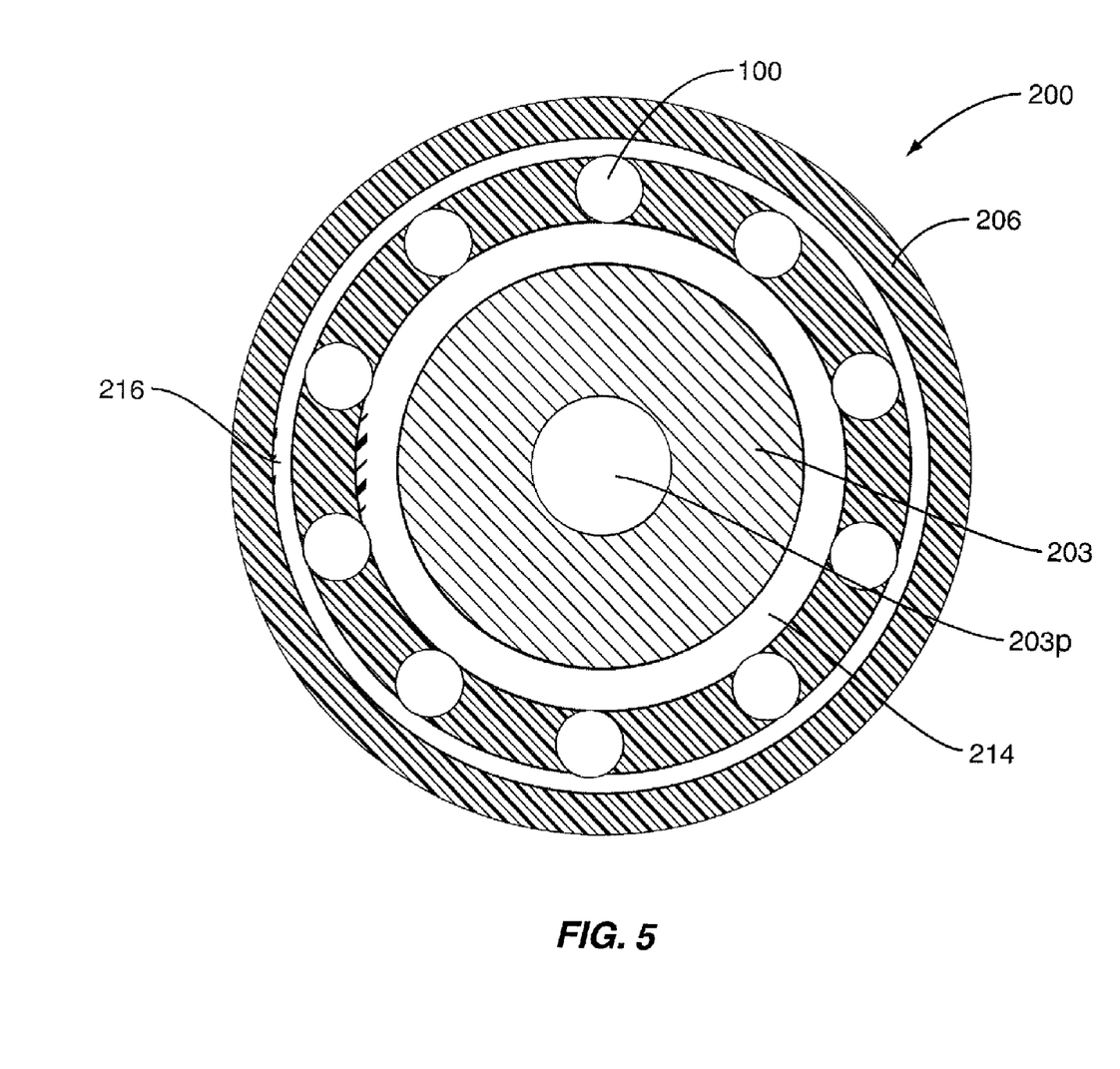
FIG. 5 is a cross section of a unicell taken through line 4-4 of FIG. 3.

The present invention is directed to a hydrogen fuel cell module 10. The fuel cell module 10 comprises a plurality of individual microcells 100 (FIG. 2). A plurality of the microcells 100 are bundled to form units referred to herein as unicells 200 (FIGS. 3-5). A plurality of the unicells 200 are then bundled together to form the fuel cell module 10 (FIGS. 1 & 7-9).

FIG. 2 illustrates an exemplary microcell 100. The basic structure and assembly of the microcell 100 is described in U.S. Pat. Nos. 5,916,514; 5,928,808; 5,989,300; 6,004,691; 6,338,913; 6,399,232; 6,403,248; 6,403,517; 6,444,339; 6,495,281; 6,884,539; and 7,229,712; and U.S. Patent Publ. Nos. 2007/0243439 and 2005/0181269 which are incorporated herein by reference. For convenience, a brief description of the microcell 100 is provided herein.

The microcell 100 comprises an inner current collector 102, a first catalyst layer 104, a proton exchange membrane (PEM) 106, a second catalyst layer 108, and a outer current collector 110. The microcell 100 could also optionally include a carbon fiber layer between the second catalyst layer 108 and outer current collector 110. The inner current collector 102 comprises an electrically conductive wire that extends longitudinally through the microcell 100. In the exemplary embodiments, the inner current collector 102 comprises a layered structure of copper, titanium, and niobium, but such is not required. The inner current collector 102 may be exposed at the ends of the microcell 100, if desired. The inner current collector 102 may have a plurality of microchannels 112 formed therein to permit the flow of air or oxygen through the microcell 100. The first catalyst layer 104, PEM 106, and second catalyst layer 108 surround the inner current collector 102. The first and second catalyst layers 104, 108 may, for example, comprise layers of a platinum catalyst. The outer current collector 110 winds around the second catalyst layer 108. In one embodiment, the outer current collector 110 is a titanium wire wound at a uniform pitch P, which may be substantially the diameter of outer current collector 110 or may be larger. A microcell 100 is typically in the range of 200 microns to 3 millimeters in diameter.

FIGS. 3-5 illustrate an exemplary unicell 200. A unicell 200 is a fuel cell assembly comprising a plurality of microcells 100 bundled together. The unicell 200 is elongated and cylindrical in form with a first end 201 and a second end 202. In general, one of the ends, 201,203 functions as an anodic end, while the other end functions as a cathodic end. For simplicity of description, it will be assumed that end 201 functions as the cathodic end and end 203 functions as anodic end; however, it should be understood that the unicell 200 could easily have an opposite anodic/cathodic configuration.

In the illustrated embodiment, there are ten microcells 100 in a unicell 200, although those skilled in the art will appreciate that any number of microcells 100 could be used. The microcells 100 are circumferentially spaced around a central member 203. The central member 203 may comprise a solid rod or a hollow tube, with either made of an electrically-conductive material or an electrically non-conductive material. The tube may be ¹⁄₁₆ inches to ½ inches in diameter and 1-30 cm in length. In one embodiment, the central member 203 is hollow and functions as a heat exchange tube through which a coolant fluid flows. The central member 203 may be fabricated from the same material as inner current collector 102.

A pair of spaced-apart seals 204, 206 is disposed at each end of the unicell 200. The seals 204, 206 are preferably formed by a molded electrically nonconductive epoxy. A gap 208 is formed between the inner seals 206 and outer seals 204 at each end 201, 202 of the unicell 200. The inner current collectors 102 of the microcells 100 extend through the inner seals 206, across gaps 208, and at least partially through the outer seals 204. The inner current collectors 102 of the microcells 100 are exposed within the gap 208 so that one of the gaseous reactants (e.g., air) can enter into the microchannels 112 at one end of the microcells 100 and exit at the opposite end. The first catalyst layer 104, PEM 106, and second catalyst layer 108 may terminate at the inner seal 206.

A conductive wrap 212 winds in helical fashion around the microcells 100 and holds the microcells 100 to electrically connect the outer current collectors 110 of the microcells 100. The conductive wrap 212 also holds the microcells 100 in close contact with the central member 203 so as to provide good electrical contact between the outer current collectors 110 of the microcells 100 and the central member 203. The conductive wrap 212 preferably includes a substantially flat surface in contact with the outer current collectors 110 of the microcells 100. The width W of this flat surface is preferably greater than the distance between corresponding points on two consecutive windings (i.e., the pitch) of the outer current collector 110. Conductive wrap 212 may be wrapped around the microcell bundles so that consecutive windings of wrap 212 do not touch. This arrangement provides interstitial spaces between windings that allow gases to flow around the exterior of microcells 100. In one embodiment, the wrap 212 is fabricated from the same material as inner current collector 102.

Longitudinally spaced insulators 214 may be disposed around the central member 203 at end 201, 203 of the unicell 200 to space and electrically isolate the inner current collectors 102 from the central member 203. More particularly, insulators 214 may be located at each seal 204, 206 so that the seals 204, 206 encapsulate and hold the insulators 214. In addition, an outer retention member 216 may be disposed around the microcells 100 in general alignment with insulators 214. The insulator 214 and retention member 216 may comprise a non-conductive heat shrink tubing, or other appropriate material. Preferably, inner insulator 214 and retention member 216 are significantly shorter in longitudinal length than the respective seals 204, 206 and disposed toward the end of the respective seal 204, 206 closest to gap 208. The inner insulator 214 and retention member 216 may be fully encapsulated by the material forming seals 204, 206, but may extend therefrom in some embodiments.

In the exemplary embodiment shown in FIGS. 3-5, the central member 203 terminates within the outer seal 204 at a first end 201 of the unicell 200 and protrudes at the second end 202 of the unicell 200. In this embodiment, a separate stub member 210 protrudes from the outer seal 204 at the first end 201 of the unicell 200. The outer seal 204 mechanically joins the stub member 210 with the central member 203 while at the same time electrically isolating the stub member 210 from the central member 203. The stub member 210 functions as a first electrical connector and the inner current collectors 102 of the microcells 100 are electrically connected to the stub member 210. The protruding end of the central member 203 at second end 202 of the unicell 200 functions as a second electrical connector. The protruding ends of the central member 203 and/or stub member 210 may be externally threaded if desired. In embodiments where the central member 203 comprises a heat exchange tube, the stub member 210 may have an axial opening 211 in fluid communication with the hollow longitudinal passage 203p of central member 203. A fluid passage 205 may be formed in the outer seal 204 at the first end 201 of the unicell 200 to allow coolant fluid to flow from the stub member 210 into the central member passage 203p.

Figure 6:
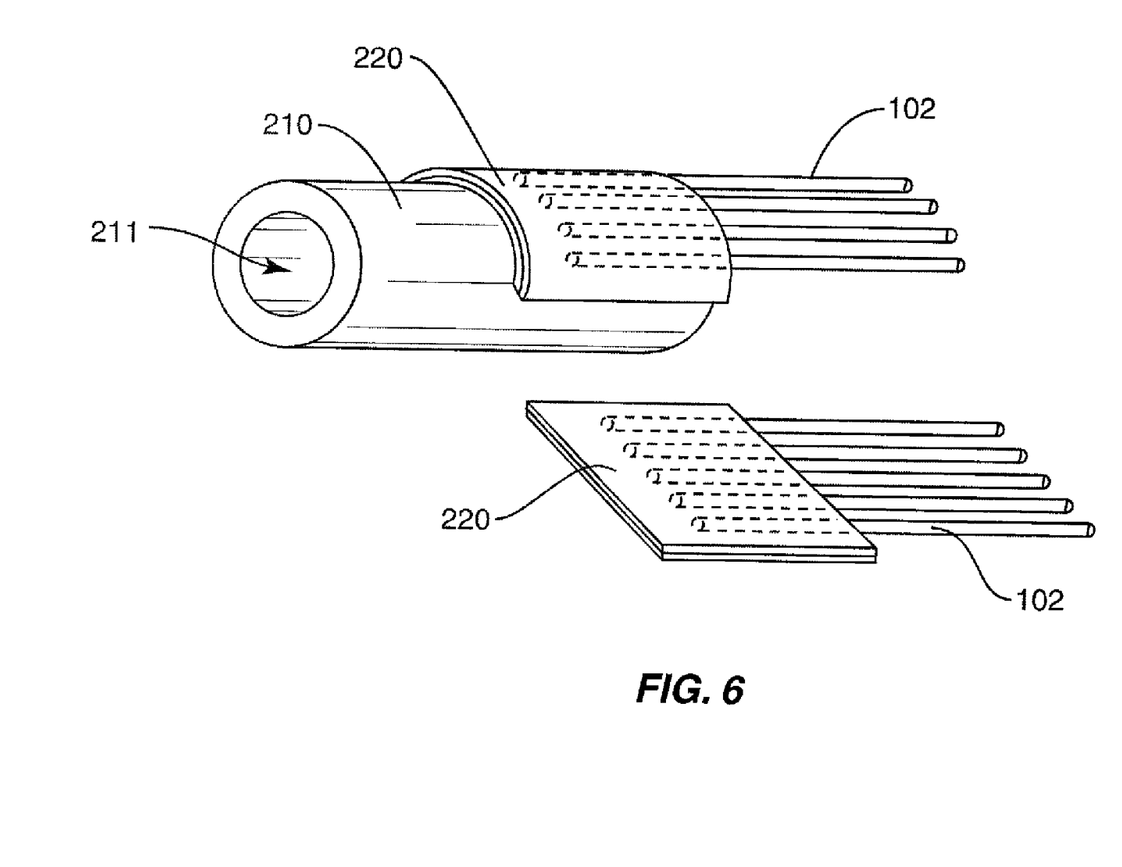
FIG. 6 illustrates an exemplary method for electrically connecting inner current collectors of a unicell.

FIG. 6 illustrates one method of electrically connecting the inner current collectors 102 of the microcells 100 to the stub member 210. The inner current collectors 102 are connected to a conductive strip 220 by any suitable means, such as by adhesive, heat welding, ultrasonic bonding, soldering, crimping, or other suitable techniques. In one exemplary embodiment, five inner current collectors are connected to each of two conductive strips 220, each made of copper. The conductive strips 220 are then formed around and electrically connected to stub member 210, such as by soldering.

Figure 7A:
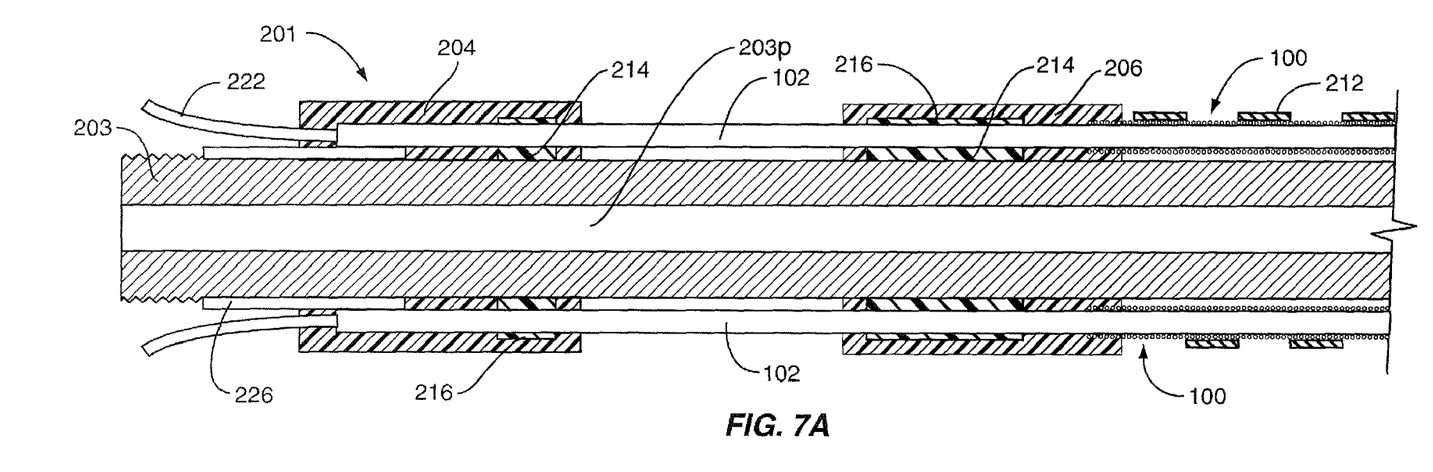
FIG. 7 is a longitudinal section view of another exemplary unicell with flexible connectors.
Figure 7B:
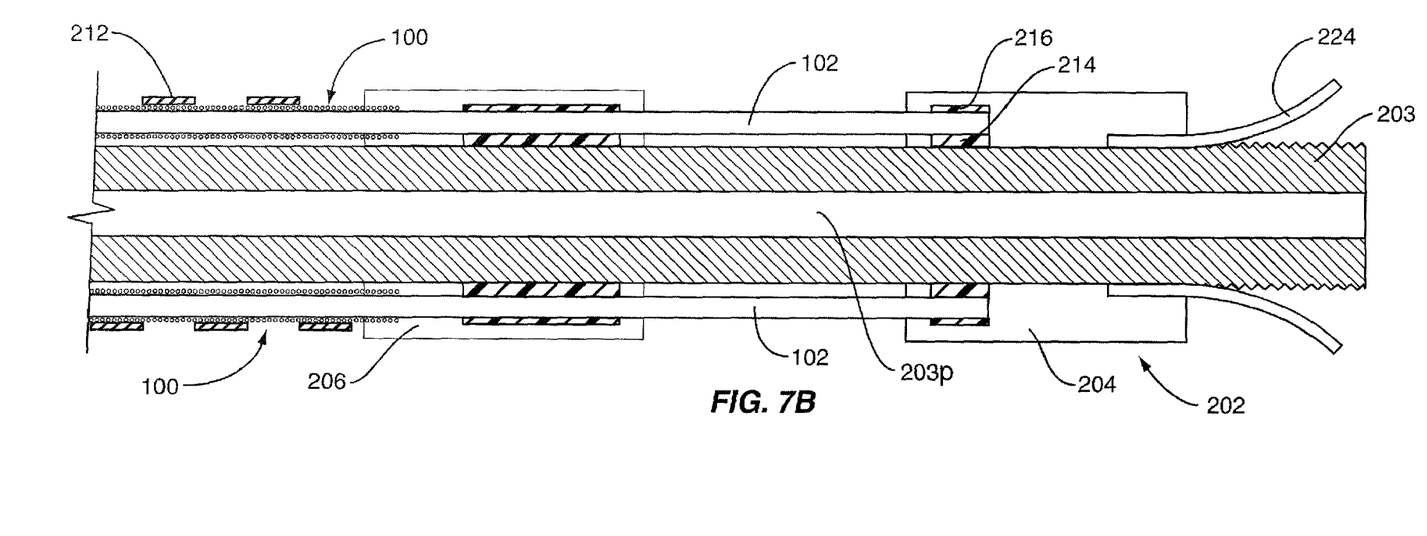

In another exemplary embodiment of the unicell 200 shown in FIGS. 7A-7B, flexible connectors 222, 224 are utilized for making the electrical connections at the ends of unicell 200. For example, inner current collectors 102 are electrically connected to one or more first flexible connectors 222 at the first end 201 of the unicell 200. This connection may be by any suitable method, such as the method described above with respect to conductive strip 220. Outer current collectors 110 and/or the central member 203 electrically connect to one or more second flexible connectors 224 at the second end 202 of the unicell 200. The flexible connectors 222,224 may comprise braided wires, although any other form of flexible connection known in the electrical arts may be used. In one embodiment, two or more flexible connectors 222, 224 are disposed at each end 201, 202, respectively. With such connections, central member 203 may protrude at both ends 201, 202 of the unicell 200, with protruding ends of central member 203 externally threaded or otherwise configured to assist in mechanically securing the unicells 200. Suitable measures should be taken to electrically insulate the central member 203 from the inner current collectors 102 and associated flexible connector 222, such as by providing an electrically insulating material layer 226 there between at the first end 201 of the unicell 200.

The unicells 200 are bundled together to form fuel cell modules 10. A fuel cell module typically comprises many unicells 200. The number of unicells 200 in a fuel cell module could vary from 1 to approximately 1000, but more typically is in the range of twenty-five to a hundred. The fuel cell module 10 will typically have a diameter in the range of 0.25 inches to 12.0 inches. Those skilled in the art will appreciate that the number of unicells 200 in a module 10 is not material and in general is dictated by factors such as size, weight, and desired power output.

Figure 8:
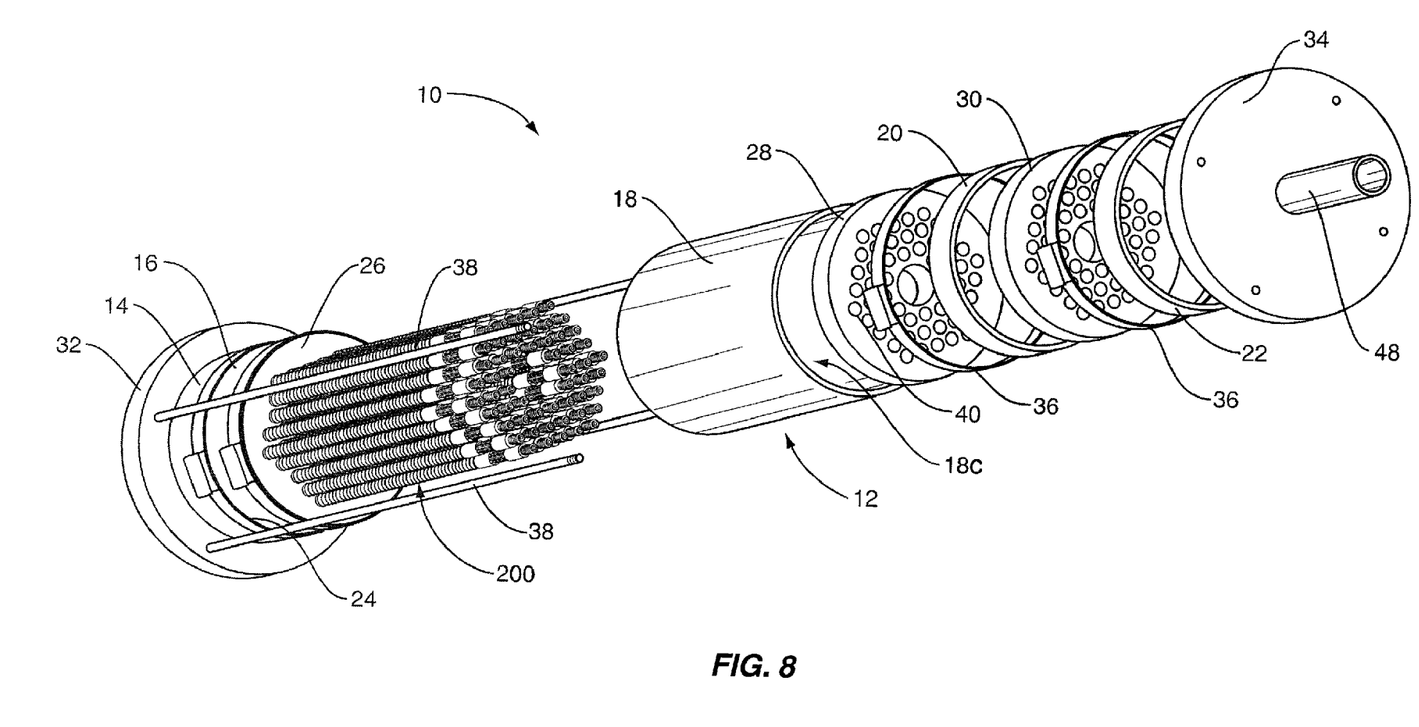
FIG. 8 is an exploded perspective view of a fuel cell module.
Figure 9:
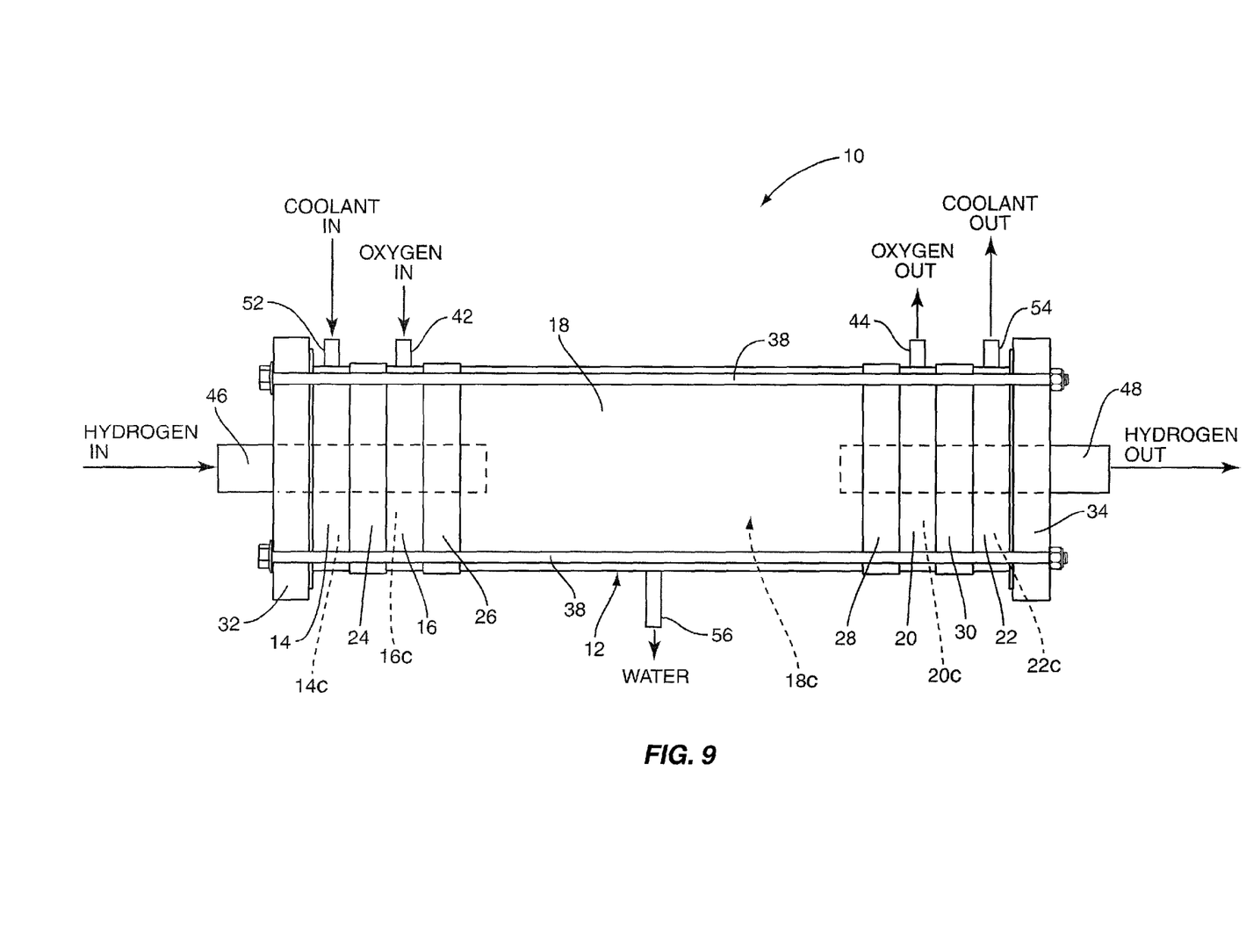
FIG. 9 is a side elevation view of a fuel cell module.

FIGS. 8-9 illustrate the assembly of an exemplary fuel cell module 10. The exemplary fuel cell module 10 includes a housing 12. The exemplary housing 12 is generally cylindrical and comprises five housing sections 14, 16, 18, 20, 22; four bulkheads 24, 26, 28, 30; and two end plates 32, 34. The housing sections 14, 16, 18, 20, 22 can be made from a wide range of materials including metals, fiberglass, and carbon-reinforced epoxy composites. For ease of reference, housing sections 14, 22 are referred to as the end sections, housing sections 16 and 20 are referred to as the intermediate sections, and housing section 18 is referred to as the center section. The bulkheads 24, 26, 28, 30 are disposed between respective housing sections and may be similar to or slightly larger in diameter than housing sections 14, 16, 18, 20, 22. Bulkheads 24, 26, 28, 30 are made from a compressible material that is also electrically nonconductive, such as silicone or fluoro-silicone. Compression members, such as clamps 36, are disposed around bulkheads 24, 26, 28, 30 to radially compress bulkheads 24, 26, 28, 30. End plates 32, 34 are disposed at opposing ends of the fuel cell module 10 and may be made of a conductive material, such as a metal. A gasket (not shown) may be disposed between the endplates 32, 34 and respective housing sections 14, 22 to provide a fluid tight seal. The entire assembly is longitudinally held together by tension rods 38 that pass through end plates 32, 34. Tension rods 38 may be threaded at each end and secured by threaded connectors. When the threaded connectors are tightened, the end caps 32, 34 apply an axially compressive force that forces housing sections 14, 16,18, 20, 22 and bulkheads 24, 26, 28, 30 together so as to form seals therebetween.

As shown in FIG. 8, bulkheads 24, 26, 28, 30 have a plurality of openings 40 formed therein. The unicells 200 extend through the openings 40 in the bulkheads 24, 26, 28, 30 so that the ends of the unicells 200 terminate within the end sections 14, 22 of housing 12. Seals 204, 206 of the unicells 200 align with the bulkheads 24, 26, 28, 30. When the bulkheads are radially compressed, a gas-tight seal is formed between the bulkheads 24, 26, 28, 30 and the seals 204, 206. The seal formed is sufficient to prevent the undesired flow of the gaseous reactants through the sealed sections at the normal operating pressures of 15-20 psi. The openings 40 are preferably slightly undersized with respect to the size of the corresponding seals 204, 206 to provide an interference fit. If desired, one or more openings 40 may of a different size, such as a larger central opening for acceptance of an input/output line, as discussed further below. The openings 40 are advantageously arranged in a close-packed configuration, and the bulkheads 24, 26, 28, 30 are advantageously identical, although neither condition is required for all embodiments.

The opposing ends of the housing sections 16, 18, 20 seat against the opposing faces of respective bulkheads 24, 26, 28, 30. A first end of housing sections 14, 22 seats against a respective end plate 32, 34 and a second end of housing sections 14, 22 seats against a respective bulkhead 24, 30. When the tension rods 38 are tightened, the entire assembly is axially compressed to form gas-tight seals between the ends of the housing sections 14, 16, 18, 20, 22; the bulkheads 24, 26, 28, 30; and end plates 32, 34.

The bulkheads 24, 26, 28, 30 divide the interior of the fuel cell module 10 into five chambers. The three center chambers 16c, 18c, 20c serve as gas chambers for gas reactants. The outer chambers 14c, 22c may serve as fluid chambers for a coolant. Of course, additional bulkheads and housing sections may be included, so as to form additional chamber(s) if desired. Also, those skilled in the art will appreciate that the housing may include fewer than five chambers in some embodiments.

A gas inlet 42 for a first gas reactant is disposed in housing section 16 and a corresponding gas outlet 44 is disposed in housing section 20. A gas inlet 46 and gas outlet 48 for the second gas reactant may be disposed along the longitudinal axis of the fuel cell module 10 and extend into housing section 18. In this embodiment, the endplates 32, 34, as well as the bulkheads 24, 26, 28, 30 include a central opening for the gas inlet 46 and gas outlet 48 respectively. The gas inlet 46 may comprise a tube that extends along the axis of the fuel cell module 10 through endplate 32 and bulkheads 24, 26 and terminates in the central gas chamber 18c. Similarly, the gas outlet 48 may comprise a tube that extends along the axis of the fuel cell module 10 through the endplate 34 and bulkheads 30, 28, and terminates in the central gas chamber 18c. Alternatively, or in addition thereto, gas inlet 46 and gas outlet 48 may connect to the central gas chamber 18c via side entry through the periphery of housing section 18, advantageously toward opposite ends of the central housing section 18. Coolant, such as de-ionized water or air, is fed into chamber 14c, flows along the longitudinal passages 203p of the unicells 200, and into chamber 22c, from which it is exhausted, typically for cooling and recirculation.

Figure 10:
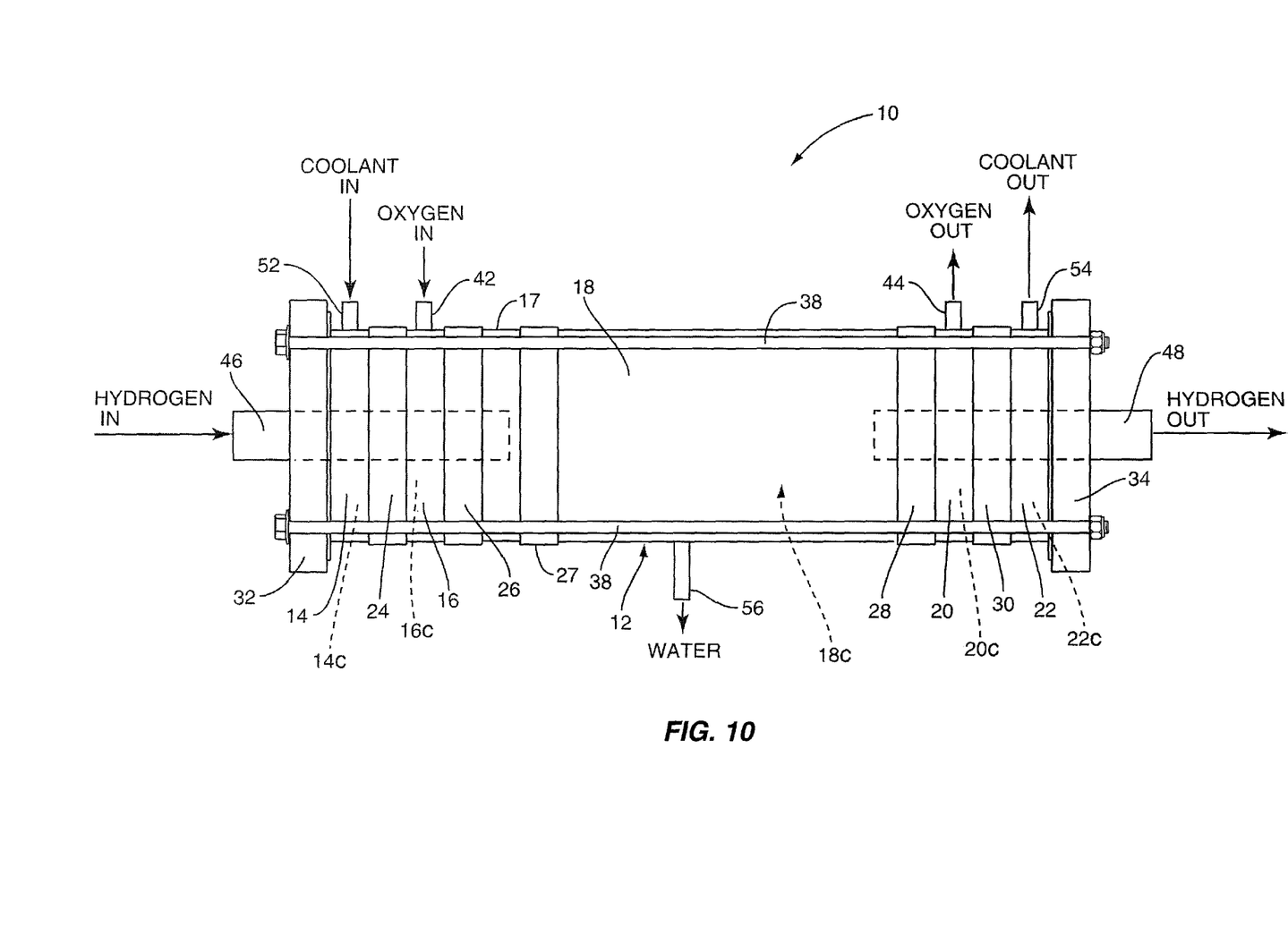
FIG. 10 is a side elevation view of another exemplary fuel cell module.

During operation, a first gas reactant, such as oxygen or air, enters the gas inlet 42 at one end of the fuel cell module 10 into gas chamber 16c, enters the microchannels 112 of the microcells 100 at gap 208, flows through the microchannels 112 into a gas chamber 20c at the opposite end of the fuel cell module 10, and exits the fuel cell module 10 through the gas outlet 44. A second gas reactant, such as hydrogen, enters gas inlet 46, fills a central gas chamber 18c surrounding the central portion of unicells 200, and exits the gas outlet 48. In a preferred embodiment, tubular sleeves 250 (shown in FIG. 3) can be placed around each unicell 200 to facilitate an axial flow of gas along each unicell 200. The tubular sleeves 250 can be made, for example, from a heat shrink material. The hydrogen gas in the central gas chamber 18c enters the tubular sleeve 250 at an end adjacent to the gas inlet 46 and exits the tubular sleeve 250 at an end adjacent the gas outlet 48. For such an arrangement, an additional bulkhead 27 and housing section 17 may be added on the inlet side of the chamber 18c as shown in FIG. 10 so as to force the gas to flow into to the tubular sleeves 250. In this embodiment, the tubular sleeves 250 may protrude slightly into housing section 17 so that the hydrogen can enter the ends of the tubular selves 250.

The operation of the fuel cell module 10 may result in the generation of water or other liquid in reaction chamber 18c, and drain 56 is provided for removing such. In addition, the operation of the fuel cell module 10 may result in the generation of significant heat. As previously noted, the central member 203 may function as a heat exchange tube to aid in removing this heat. Alternatively or in addition thereto, dedicated cooling tubes (not shown) may be interposed in the array of unicells 200. A suitable coolant may be introduced into the central member 203 and/or cooling tubes to absorb and carry off some of the heat produced by the microcells 100 during operation. Accordingly, the central member 203 and/or cooling tubes are advantageously in fluid communication with chambers 14c, 22c at each end of fuel cell module 10. A fluid inlet 52 may be disposed in the end section 14 of the housing 12 and a corresponding fluid outlet 54 may be disposed in end section 22. A liquid coolant, such as de-ionized water, enters fluid chamber 14c through fluid inlet 52, flows through the central member 203 and/or cooling tubes into the fluid chamber 22c, and exits the fuel cell module 10 through fluid outlet 54.

The unicells 200 are electrically interconnected in chamber 14c, 22c. The interconnections may be arranged so that the unicells 200 are connected in series, are connected in parallel, or in any suitable combination thereof. The unicell interconnections may be made using the flexible connectors 222, 224, or by using conductive plates mechanically and electrically connected to the central members 203 and stubs 210, or by a combination thereof, or by any other suitable electrical interconnection means known in the electrical arts. When compressible bulkheads are employed, care should be taken to allow for possible relative movement between the unicells 200 as the bulkheads are peripherally compressed.

Figure 11:
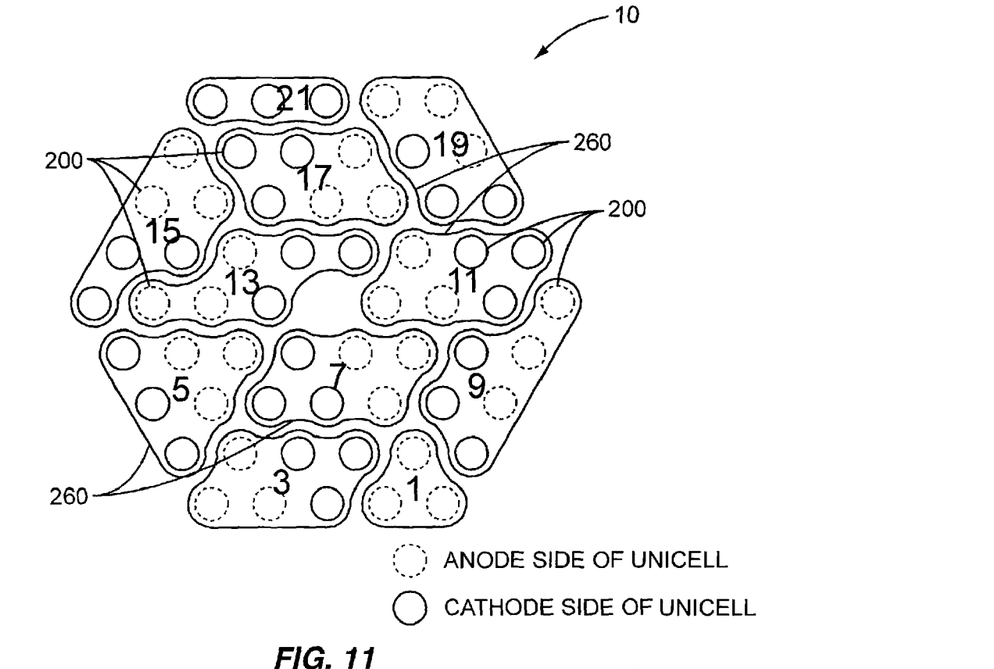
FIG. 11 is a schematic diagram illustrating the electrical connections between unicells at a first end of a fuel cell module.
Figure 12:
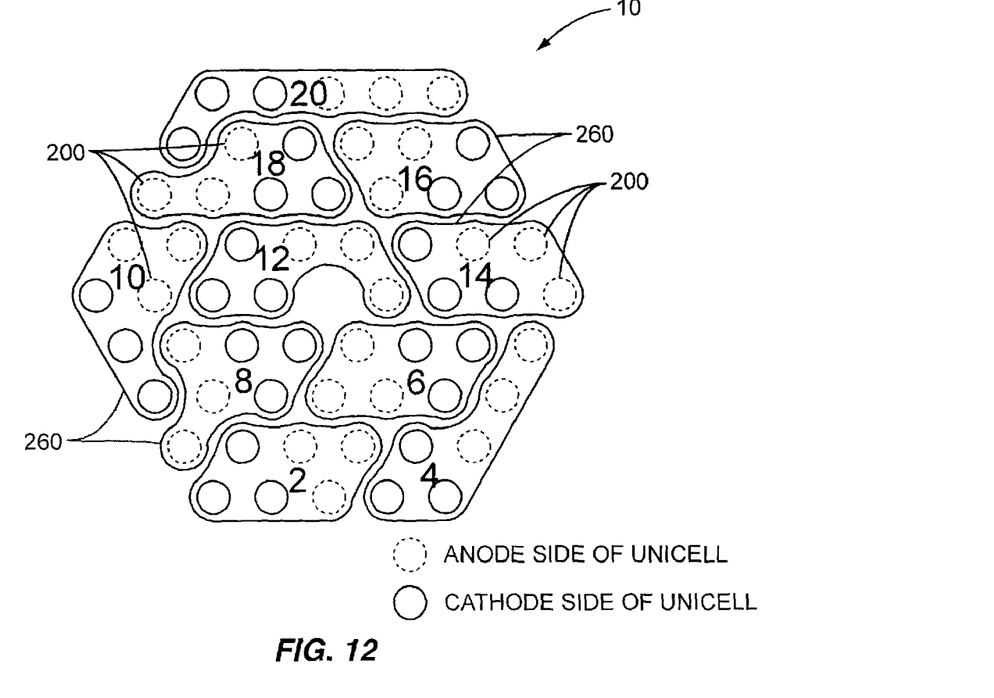
FIG. 12 is a schematic diagram illustrating the electrical connections between unicells at a second end of a fuel cell module.

FIGS. 11 and 12 illustrate an exemplary method of interconnecting unicells 200 in a fuel cell module 10. As shown in FIGS. 11 and 12, the individual unicells 200 are interconnected by conductive plates 260 that connect the central members 203 and/or stubs 210 of the unicells 200. The conductive plates 260 may be held in place by nuts (not shown) that thread onto the ends of the central members 203 and/or stubs 210 of the unicells 200. The orientation of the unicells 200 is illustrated by solid and dashed lines. The unicells 200 are organized into groups of three unicells 200. The three unicells 200 in each group are connected in parallel. All of the groups are then connected in series. Of course, the number of unicells 200 in each group can be varied depending on the desired current and/or voltage.

The present invention may be carried out in other specific ways than those herein set forth without departing from the scope and essential characteristics of the invention. Further, the various aspects of the disclosed device and method may be used alone or in any combination, as is desired. The disclosed embodiments are, therefore, to be considered in all respects as illustrative and not restrictive, and all changes coming within the meaning and equivalency range of the appended claims are intended to be embraced therein.

The invention claimed is:

1. A fuel cell module, comprising:
a housing including a plurality of housing sections;
a plurality of elongated cylindrical fuel cell elements contained inside said housing;
a compressible bulkhead disposed between two adjacent housing sections and having a plurality of holes formed therein to allow respective fuel cell elements to pass through said bulkhead; and
a clamp element disposed about said bulkhead for radially compressing said bulkhead to form a gas-tight seal between said bulkhead and said fuel cell elements.

2. The fuel cell module of claim 1 wherein said fuel cell elements include a seal aligned with said bulkhead to form a gas-tight seal when the bulkhead is radially compressed.

3. The fuel cell module of claim 1 wherein each of said fuel cell elements comprises a bundle of cylindrical microcells, each said microcell including an inner current collector having one or more microchannels formed therein, an inner catalyst layer surrounding the inner current collector, a proton exchange membrane surrounding said inner current collector and inner catalyst layer, an outer catalyst layer surrounding the proton exchange membrane, and an outer current collector disposed on the outside of said proton exchange membrane and outer catalyst layer.

4. The fuel cell module of claim 3 including two or more bulkheads that divide said housing into a plurality of chambers including a gas reaction chamber for a first gas reactant, an inlet chamber for a second gas reactant, and an outlet chamber for said second gas reactant.

5. The fuel cell module of claim 4 wherein said outer current collectors of said microcells are exposed to said first gas reactant in said reaction chamber.

6. The fuel cell module of claim 5 wherein said microchannels in said first current collectors of said microcells are in fluid communication with said inlet chamber and said outlet chamber so that said second gas reactant flows from said first inlet chamber through said microchannels in said inner current collectors to said first outlet chamber.

7. The fuel cell module of claim 1 wherein said bulkhead is made of an electrically non-conductive material.

8. The fuel cell module of claim 7 wherein said bulkhead is made of silicone or flouro-silicone.

9. A fuel cell module comprising:
a housing including plurality of cylindrical housing sections;
a plurality of elongated cylindrical fuel cell elements contained inside said housing;
a plurality of bulkheads disposed between said housing sections forming seals between adjacent housing sections; and
a pair of endplates disposed at opposing ends of said housing for applying an axially compressive force to said housing to create a gas-tight seal between said housing sections and said bulkheads.

10. The fuel cell module of claim 9 wherein said bulkheads divide the interior of said housing into a plurality of chambers including a reaction chamber for a first gas reactant, a first inlet chamber for a second gas reactant, and a first outlet chamber for said second gas reactant.

11. The fuel cell module of claim 10 further including an inlet tube passing through one or more bulkheads at a first end of said housing for introducing said first gas reactant to said reaction chamber.

12. The fuel cell module of claim 11 further including an outlet tube passing through one or more bulkheads at a second end of said housing for allowing said first gas reactant to exit said reaction chamber.

13. The fuel cell module of claim 10 wherein said chambers further include a second inlet chamber for introducing a coolant into said housing and a second outlet chamber for allowing coolant to exit from said housing.

14. The fuel cell module of claim 10 wherein each fuel cell element comprises a bundle of cylindrical microcells, each said microcell including an inner current collector having one or more microchannels formed therein, an inner catalyst layer surrounding the inner current collector, a proton exchange membrane surrounding said inner current collector and inner catalyst layer, an outer catalyst layer surrounding the proton exchange membrane, and an outer current collector disposed on the outside of said proton exchange membrane and outer catalyst layer.

15. The fuel cell module of claim 14 wherein said outer current collectors of said microcells are exposed to said first gas reactant in said reaction chamber.

16. The fuel cell module of claim 15 wherein said microchannels in said first current collectors of said microcells are in fluid communication with said first inlet chamber and said first outlet chamber so that said second gas reactant flows from said first inlet chamber through said microchannels in said inner current collectors to said first outlet chamber.

17. The fuel cell module of claim 9 wherein each of said bulkheads include a plurality of holes formed therein to receive respective fuel cell elements.

18. The fuel cell of claim 17 further comprising one or more compression clamps disposed around said bulkheads for compressing said bulkheads to form a gas-tight seal between said bulkheads and said fuel cell elements.

19. The fuel cell module of claim 9 wherein said bulkheads are made of an electrically non-conductive material.

20. The fuel cell module of claim 19 wherein said bulkheads are made of silicone or flouro-silicone.

21. A fuel cell module comprising:
  a housing including plurality of cylindrical housing sections;
  a plurality of bulkheads disposed between said housing sections and dividing said housing into a plurality of chambers including a reaction chamber for a first gas reactant, an inlet chamber for a second gas reactant, and an outlet chamber for said second gas reactant;
  a plurality of elongated cylindrical fuel cell elements contained inside said housing and passing through respective openings in said bulkheads so that first end portions of said fuel cell elements are contained in said first inlet chamber, intermediate portions of said fuel cell elements are disposed in said reaction chamber, and second end portions of said fuel cell elements are contained in said first outlet chamber; and
  one or more compression clamps for radially compressing said bulkheads to form a gas-tight seal between said bulkheads and said fuel cell elements.

22. The fuel cell module of claim 21 wherein said fuel cell elements comprise a plurality of cylindrical microcells, each said microcell including an inner current collector having one or more microchannels formed therein, an inner catalyst layer surrounding the inner current collector, a proton exchange membrane surrounding said inner current collector and inner catalyst layer, an outer catalyst layer surrounding the proton exchange membrane, and an outer current collector disposed on the outside of said proton exchange membrane and outer catalyst layer.

23. The fuel cell module of claim 22 wherein said outer current collectors of said microcells are exposed to said first gas reactant in said reaction chamber.

24. The fuel cell module of claim 21 wherein said microchannels in first current collectors of said microcells are in fluid communication with said first inlet chamber and said first outlet chamber so that said second gas reactant flows from said first inlet chamber through said microchannels in said inner current collectors to said first outlet chamber.

25. The fuel cell module of claim 21 further comprising a pair of endplates disposed at opposing ends of said housing for applying an axially compressive force to said housing to create a gas-tight seal between said housing sections and said bulkheads.

26. The fuel cell module of claim 21 wherein said bulkheads are made of an electrically non-conductive material.

27. The fuel cell module of claim 26 wherein said bulkheads are made of silicone or flouro-silicone.

* * * * *